Dec. 10, 1968     B. L. COLLIER     3,415,225
ARTIFICIAL ROUGHAGE FOR RUMINANTS
Filed Nov. 21, 1966
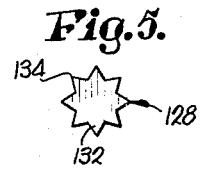
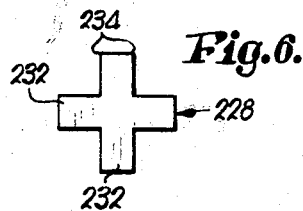
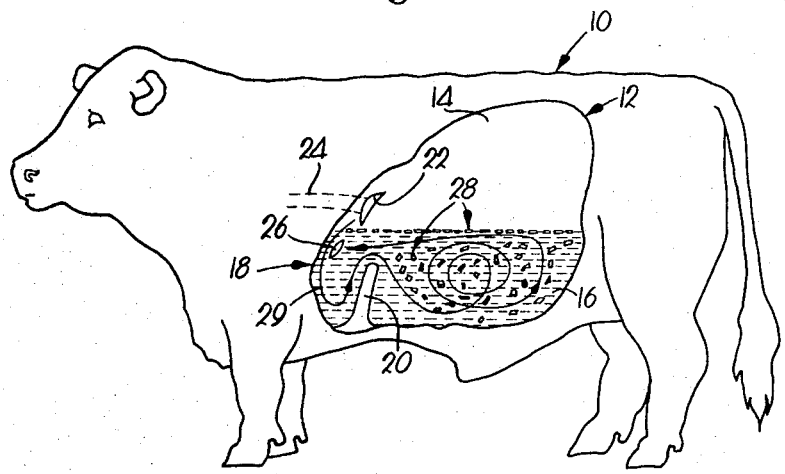
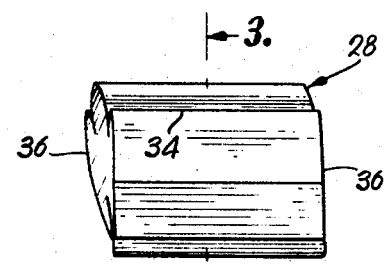
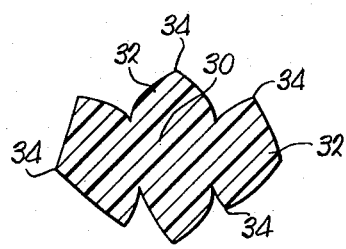
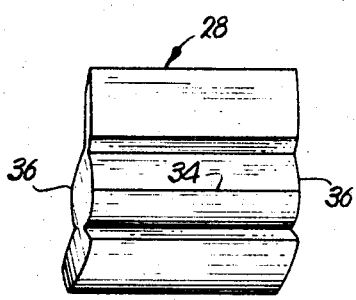
INVENTOR
Byron Leslie Collier
BY
*Hovey, Schmidt, Johnson & Hovey.*
ATTORNEYS.

United States Patent Office 3,415,225
Patented Dec. 10, 1968

3,415,225
ARTIFICIAL ROUGHAGE FOR RUMINANTS
Byron Leslie Collier, Kansas City, Mo., assignor to Farmland Industries, Inc., Kansas, City, Mo., a corporation of Kansas
Filed Nov. 21, 1966, Ser. No. 595,869
19 Claims. (Cl. 119—1)

ABSTRACT OF THE DISCLOSURE

This disclosure relates to a method and product for avoiding adverse effects of feeding a high energy low roughage ration to ruminants. A quantity of relatively light weight, inert bodies or pellets of plastic or other suitable material are orally administered to the ruminant. The pellets have rough outer surfaces to stimulate production of saliva for maintaining proper pH in the animal's stomach by physical contact of the pellets against the stomach wall. The low specific gravity of the pellets enhances retention of the pellets within the stomach.

---

This invention relates to animal feeding and more particularly to a method and material for eliminating the adverse effects ordinarily attendant upon the feeding of a high energy, low roughage ration to ruminants. It has long been known that it is necessary that the ration fed to ruminants be composed of any of a variety of relatively coarse, often highly fibrous roughage material in addition to high energy feeds such as grain, concentrates or the like, in order to avoid effects such as bloating and founder syndrome. It is generally believed that the high fiber content of the relatively indigestible roughage material stimulates nerve receptors which are located within the rumino-reticular cavity of the ruminant, thereby physiologically triggering the production of glandular saliva which flows into the animal's stomach. The saliva is thought to have a pH on the alkaline side. This saliva tends to neutralize an acid condition which would otherwise maintain in the animal's stomach. The rumen is the largest of four stomach compartments of the ruminant and serves as a location for important break-down of ingesta through micro-organism action. It is extremely necessary for proper digestion and assimilation of the food intake by the animal that the proper type of micro-organisms flourish in the rumen. When the rumen content pH is not proper, the wrong type of microflora are produced, thereby contributing to the adverse effects mentioned above.

One of the characteristics of ruminants resides in the fact that such animals ruminate at fairly regular intervals and over substantial periods of time. During such rumination, portions of the ruminant and reticular contents are returned to the mouth for mastication and reinsalivation. The contents are then reswallowed and ultimately find their way through the rumen and reticulum to the omasum and abomasum sections of the stomach for ultimate passage through the remainder of the animal's alimentary canal during which assimilation of the available food products occurs.

It has been postulated and fairly well established that the apparently reflex act of rumination may be stimulated by physical contact of roughage material contained in the ingesta with nerve receptors in the animal's stomach. It is also believed that these receptors are located primarily in the reticulum and the anterior part of the rumen.

The relatively low energy content of the roughage portion of the animal's ration together with the great amount of time spent by ruminants in ruminating contributes to lower growth and gain efficiency than is achievable if the animal can spend a greater proportion of time eating a relatively high energy, high gain diet. This not only produces maximum weight gain per day per animal, but it also materially reduces the costs of storing and handling ruminant feed anad minimizes manure handling problems.

It has been discovered that cracked oyster shell fed in carefully controlled quantities to ruminants minimizes or even eliminates the necessity for feeding roughage to ruminants. Whereas the precise physiological action of the oyster shell content of the animal's ration is not fully understood, it is believed that the oyster shell stimulates the nervous receptors in the rumen, thereby triggering production of saliva in quantities sufficient to maintain a proper pH condition in the rumen and other stomach compartments without the necessity for ordinary roughage feeds to be administered to the animal to produce the required amounts of saliva. It is further recognized that the chemical composition of oyster shell itself may also contribute to maintenance of the desirable pH of the stomach contents to create the necessary environment for production of those micro-organisms which are essential to desirable biological action upon the materials which enter the rumen.

It has been found that ruminants fed oyster shell as a roughage replacement either do not ruminate or such rumination is greatly minimized. This result is thought to obtain by virtue of the fact that the nervous receptors which stimulate the rumination reflex are, for the most part, not contacted by the oyster shell. This lack of contact is thought to result from the fact that the receptors are located either in the anterior portion of the rumen or in the reticulum (which may be regarded as an anterior continuation of the rumen with which the latter freely communicates over the rumino-reticular fold) or both. It is believed that anything swallowed in a normal manner in the mature ruminant goes first to the anterior dorsal sac of the rumen. A good deal of the heavier food soon finds its way into the reticulum. When roughage forms a part of the diet the relatively light roughage, after it has been in the rumen for awhile, begins to become saturated, becomes heavier and softer and is probably pulled toward the anterior portion of the rumen and the reticulum where it can stimulate the rumination reflex. The ruminal reticular action which causes mobility of the quite moist ingesta toward the nervous receptors controlling rumination may not, however, affect the relatively indigestible foreign matter such as oyster shell. Accordingly, the oyster shell is probably not brought into contact with these receptors.

Despite the fact that oyster shell has permitted more concentrated feeding of ruminants such as cattle, it has certain disadvantages. These include the fact that the relatively sharp edges and splinters of the oyster shell may damage the animal's gingival cavity and alimentary canal, are abrasive to the animal's teeth and are also abrasive to auger and similar feed distribution systems commonly utilized in modern farming methods. Further, the weight of the oyster shell makes it a substance which contributes to overall feed handling problems and also produces a tendency for the material to segregate from the remaining portions of the ration. This renders proper distribution of the optimum quantities of the material throughout the ration difficult. Splinters from the oyster shell which become imbedded in the soft tissue of the animal's mouth sometimes cause the latter to reduce, rather than increase, its overall food consumption.

One further and very important disadvantage with oyster shell as a replacement for animal roughage resides in the fact that the oyster shell is not retained within the animal. This requires repeated administration of this material to the animal heightening many of the problems referred to above.

Accordingly, it is the most important object of this invention to provide a method and material for eliminating the adverse effects attendent upon feeding a high energy, low roughage ration to ruminants which overcomes the deficiencies of heretofore utilized methods and materials utilized for this purpose.

It is, therefore, a very important object of this invention to provide a material which may be orally administered to the animal to minimize or eliminate roughage requirements in the animal's ration and which will not damage the tissue of the animal.

It is a further important object of this invention to provide such a material which is retained in the stomach of the animal, thereby permitting continued advantageous results following initial administration of the material to the animal.

Another object of the invention is to proivde material for obtaining the foregoing advantages which material is relatively inexpensive, easy to fabricate into configurations capable of imparting desirable physiological stimulation to production of animal saliva, and which may be easily admixed to the animal's ration to facilitate oral administering with the feed.

It is another important object of this invention to provide bodies for producing the proper environmental conditions for necessary ruminal activity, which bodies are inert to the contents of the stomach with which they come in contact.

These and other important objects of the invention will become apparent or will be further pointed out in the following specification and claims, taken in consideration of the drawing.

In the drawing:

FIG. 1 is a diagrammatic view of a bovine ruminant illustrating the relative location of the rumen and reticulum showing generally a path of flow of material into the stomach and illustrating the massaging bodies of this invention in relation to ruminal and reticular contents;

FIG. 2 is an enlarged perspective view of one form of massaging body or pellet constructed pursuant to the principles of this invention;

FIG. 3 is a cross-sectional view taken along line 3—3 of FIG. 2;

FIG. 4 is a bottom perspective view of the body of FIG. 2;

FIG. 5 is an end elevational view on a reduced scale of a modified form of massaging body; and FIG. 6 is an end elevational view on the same scale as FIG. 5 of yet further modified form of massaging body.

Referring now to FIG. 1, a ruminant 10, such as the bovine species illustrated, has a rumen 12 which is divided generally into a dorsal sac 14 and a ventral sac 16. The reticulum 18 is an anterior, pouch-like extension of the rumen and is separated from the latter by dam-like tissue 20 which is called the rumino-reticular fold. The cardia 22 is the opening of the esophagus 24 into the stomach and is located generally in partial overying relationship to the reticulum and anterior portion of the rumen whereby ingesta swallowed by the animal may enter the rumino-reticular cavity. The reticulo-omasal orifice 26 provides a passageway for the out flow of content from the rumino-reticular cavity into the ruminant stomach compartments called the omasum and abomasum (not shown), the latter of which communicates with the small intestine. FIG. 1 of the drawing is intended solely for the purpose of providing general orientation concerning the description which is to follow and is not intended as a technically accurate, anatomical drawing depicting precise construction and location of the organs of the animal.

It has been discovered that ruminants which are orally administered predetermined quantities of bodies or pellets of sizes and specific gravities falling into ranges to be described below will not suffer the disadvantageous effects normally attendant upon elimination of the roughage content of the ruminant's diet. One such body 28 is illustrated in FIGS. 2, 3 and 4 of the drawing and comprises a central section 30 and integral outwardly extending projections 32. Body 28 is formed from synthetic resin material. The projections 32 are configured substantially as illustrated to present a plurality of relatively sharp edges 34 at spaced intervals on the circumference of body 23, thereby giving the latter a roughened outer surface. Whereas the precise shape of the material forming body 28 is not critical, the body should be characterized by the property of having a sufficiently roughened outer surface to physiologically trigger secretion of saliva by the animal through physical contact of such roughened surface with the wall of the animal's rumen when quantities of body 28 have been orally administered to the animal. Further, the edges 34 of the end edges 36 of the bodies 28 should not be of a nature as to not cause deleterious abrasion to the stomach wall nor should they cause such abrasion to the gingival cavity or digestive track. The characteristic of the bodies 28 avoiding such deleterious abrasion is not solely limited to the exact shape of the body but derives in part from the material from which the bodies are constructed. It has been found that relatively low density, extrudable plastic substances are ideally suited for construction of the bodies 28.

Any of a number of available materials may be utilized for the purpose of constructing bodies 28, it being understood that the materials should be relatively cheap, should have a specific gravity no greater than an animal's ruminal fluid (approximately 1.15) and preferably of less than 1 as will be explained hereinafter), and should also be relatively inert to the stomach contents. Extrudable plastics such as polyethylene, polypropylene and polystyrene have been found suitable.

It will be recognized that the administering of materials to animals forming a source of food for human consumption must comply with the Federal regulations governing those materials which are acceptable for this purpose. It is contemplated that olefin polymers which are approved for food additives as set forth in Section 121.2501 of the Federal Food, Drug and Cosmetic Act as amended 31 F. R. 6830 and 31 F. R. 7173 may be utilized. Further, those polymeric substances containing a plasticizer approved in Section 121.2511 of the foregoing act as amended, 31, F. R. 2960 may also be utilized. The polymers may or may not be of the rubber modified type, consistent with the desirability that the specific gravities of the bodies be maintained less than 1, that the systems from which the bodies are made are acceptable for food additives, and that any plasticizers utilized should be of the non-migratory or non-leachable type and they should also be approved as additives to food for human consumption.

The coloration of the bodies 28 is not critical although the material from which the bodies are constructed can be colored to create a pleasing aesthetic appearance and to prevent a tendency for the animal to segrate the bodies from the remaining constituents of the ration when the bodies are mixed with the feed. It has been found that a yellow coloration for the bodies 28 is desirable. The color additive or dye should also be of the non-migratory type and approved for use in animals intended for human consumption. An example of a dye of this character is benzidine yellow.

Whereas plastic materials have been utilized with desirable results in the construction of bodies 28, it is contemplated within the principles of this invention that other materials such as wood pulp or the like containing a suitable binder might also be utilized. One disadvantage with materials having a high cellulose content such as wood pulp resides in the tendency of such material to be ultimately digestible when exposed to the ordinary environment of the rumen. However, substances to retard breakdown of the fibers are known to those skilled in the art and could be utilized to impregnate the wood or otherwise to provide sufficient longevity for the bodies within the rumen to produce desirable results for relatively long periods of time.

It is also contemplated that various relatively inert materials which might have specific gravities greater than 1 could be utilized if formed hollow or otherwise compartmentalized so that the overall specific gravities of the bodies remain less than 1. This specific gravity relationship is important to produce the relative floatability of the bodies when in the stomach.

In carrying out the principles of this invention, quantities of bodies 28 are orally administered to the animal either by admixing the bodies in predetermined amounts with the ration for normal intake by the animal at feeding time or the bodies 28 may be administered by a balling gun or other means of forcibly inserting the bodies into the stomach of the animal. Whereas the precise operation of the bodies once they are within the stomach cavity is not fully known, the observable results which have been obtained with animals fed quantities of such bodies and from which roughage has been eliminated as a ration constituent give rise to a theory of probable operation. It is theorized that the bodies enter through the cardia 22 into either the reticulum 18 or the rumen 12 or both. Because of the relatively light weight of the bodies 28, the latter having specific gravities less than 1, they have a tendency to float on the mass of stomach content which mass is ordinarily comprised of material having a relatively high water content. A line designated 29 in FIG. 1 indicates generally a probable path of food material through the reticulum and rumen.

Accordingly, the bodies 28 have a tendency to be moved toward the posterior portion of the rumen by normal stomach motility. Again, because of the relatively light weight of the bodies with respect to the remainder of the stomach contents, there is little tendency for the bodies 28 to be drawn toward the anterior portion of the rumen and toward the reticulum by the pump-like action of the reticulum. Rather, such action draws the generally heavier and more liquid portions of the content into this area while mixing, kneading and churning action which the rumen and reticular motility gives to the contents tends to separate the bodies 28 so that the latter may remain more toward the posterior region of the rumen. Further, the dam-like rumino-recticular fold 20 may contribute to keep the bodies 28 within the posterior region of the rumen.

All the while, the relatively roughened outer surface of the bodies 28 physically massage or otherwise contact those receptors for the nerves (generally believed to be the vagi nerves) located in the rumen wall and this parasympathetic nervous system in turn produces the impulses to the brain which initiate salivary glandular action causing production of saliva flowing to the rumen. It has heretofore been known that enormous amounts of saliva are required by ruminants such as cattle and quantities of saliva production up to as much as ten gallons per day in mature cows has been observed.

Apparently this saliva which finds its way into the rumen acts as a buffer to maintain a near neutral condition within the reticulum and rumen thereby enhancing the production of desirable micro-organisms which are so essential to the break-down of ingesta in the rumen.

One of the unexpected results attendant upon the use of artificial stimulators in the nature of bodies 28 having specific gravities less than one has been that such bodies are retained within the animal's stomach and are not passed by the animal. Whereas, again the precise reason for this phenomenon is not fully understood, it may be theorized that the relatively light weight of the bodies 28 prevents their being drawn into the anterior region of the rumen and recticulum through ordinary pump-like action of the latter as occurs with heavier particles of digested and semi-digested matter. The recticulo-omasal orifice is located in the region of the reticulum and those products which egress from the rumen and reticulum pass through this orifice. On the other hand, the bodies 28, being inert and having a tendency to float, remain away from the region of this orifice with the consequent retention in the rumen by the animal.

Similarly, it is theorized that the reduction or elimination of rumination by the animal may derive from the fact that the artificial stimulators or bodies 28 are generally located in the posterior of the rumen rather than in the vicinity of those nerve receptors which are ordinarily though to induce the rumination reflex in the animal.

As heretofore pointed out, the precise shape of the bodies 28 is not critical so long as the outer surface thereof is roughened sufficiently to stimulate production of saliva as described. Accordingly, the outer bodies may be shaped as illustrated generally in FIG. 5 wherein a body 128 may be star shaped and include outwardly extending projections 132 which are more or less regularly spaced circumferentially. The outer surface of the body provide edges 134 in position for physically contacting the nervous receptors within the wall of the rumen to stimulate production of saliva.

Another form of stimulator is illustrated in FIG. 6 wherein the body 228 is in the general shape of a cross in transverse cross-section to present opposed projections 232 having corners 234 presenting edges for physiologically stimulating the product of saliva through contact with the rumen wall as aforesaid.

Whereas it is desirable that the specific gravities of the bodies be maintained at less than 1 to insure that the specific gravity of the bodies is less than that of the stomach contents, it has been found that particularly beneficial results are obtained if the specific gravities of the bodies fall within a range of about .88 to .99 and preferably of about .90 to .92.

The optimum size of the bodies or pellets may vary and will be determined in part by the size of the animal to which they are administered. For example, the pellets which are fed to lambs should be smaller than those which are administered to mature cattle. However, it has been found that the pellets should have sizes falling within a range of between about ⅛ inch to ¾ inch in overall length and about ¼ inch to ¾ inch in overall width. It will be recognized that, in addition to the effect of the size to accomplish the best possible stimulation of saliva by physical massage of the rumen walls, the size must be selected to minimize mastication of the pellets by the animal. Of course, animal acceptability is a factor which is affected by pellet size and also the choice of material from which the pellets are constructed.

It should be pointed out at this juncture that the use of synthetic resin material for pellet construction is highly desirable, not only because of its ready availability in low cost extruded form, its relative inertness when subjected to the rumen content, and its freedom from abrasive and deleterious qualities but also because it still retains a shape capable of effecting necessary massage to the stomach wall if it becomes distorted through mastication by the animal. This is because plastic has a tendency to retain its relatively sharp edges even when flattened by mastication.

The quantities of bodies which must be administered to the animal to replace the necessity for roughage in the animal's ration will vary in accordance with the size and ordinary feed intake of the animal. Generally, from about ⅛ pound to approximately 1 pound of bodies 28 should be provided in the animal's rumen for each 100 pounds of body weight. However, tests have indicated that very desirable results have been obtained for example, when ½ pound of bodies 28 are fed to feed lot steers (averaging 600 to 700 pounds body weight) per day until a total of from 2 to 3 pounds of the bodies have been administered to the animal. The bodies are retained by the animal and there is thereafter no need to supplement the ordinary high energy ration with a roughage constituent. Although the bodies 28 are normally administered orally, they may also be introduced into the animal's rumen by other techniques, as for example through a ruminal fistula. When quantities of bodies 28 administered to the animal are maintained within the levels set forth above, there has been no appreciable tendency for the animals to ruminate. This frees the animal to consume greater amounts of the high energy ration resulting in increased efficiency of the feeding operation.

Animals fed roughage replacement in the nature of the bodies 28 of this invention have demonstrated little or no pica or craving for unnatural food such as chalk, ashes and so forth which sometimes accompanies administration of oyster shell to the ruminants.

Among other advantages of the present invention, the following may be noted. Studies have shown that administration of bodies 28 to a ruminant has the effect of maintaining or even increasing ruminal movements which are necessary for the health of the animal and the proper utilization of ingested nutrients. Furthermore, the introduction of bodies 28 of approximately one-half the size normally administered to animals of the order of 600 pounds or more in body weight, has a stimulatory effect on young ruminants, for example, of the order of three to four weeks, and accelerates the growth of the animal's rumen, increasing the size thereof above normal, and producing improved papillae development. By virtue of the ruminal movement stimulation provided by pellets 28, it is believed that such pellets may aid in the elimination of gases in the rumen which tend to accumulate therein excessive amounts under certain feeding conditions, or occasioned by a disturbance or malfunction in the animal's normal digestion processes. In certain instances, excessive gases may result in a clinical syndrome known as bloat and bodies 28 are believed to have a beneficial effect in maintaining significant eructation at a rate to, in many instances, prevent such bloat. This is especially important in those animals which are known as chronic bloaters.

It should also be noted that bodies 28 are formed of a cross-sectional configuration providing the required rough edges but at the same time designed so as not to tend to interlock during handling thereof and especially in the presence of adhesive substances such as the mucins or other liquid materials found in an animal's rumen.

Having thus described the invention, what is claimed as new and desired to be secured by Letters Patent is:

1. A method of stimulating production of saliva in ruminants to negate necessity for adding roughage to their ration, comprising:
   orally administering to the ruminant a quantity of relatively inert bodies,
   said bodies being characterized by the property of having sufficiently roughened surfaces defining raised portions and depressions to physiologically trigger secretion of saliva by the animal through physical contact with the wall of the animal's rumen without causing deleterious abrasion to such wall.

2. The invention of claim 1, the specific gravity of said bodies being less than 1.

3. The invention of claim 2, the specific gravity of said bodies being within a range of about .88 to .99.

4. The invention of claim 2, the specific gravity of said bodies being within a range of about .90 to .92.

5. The invention of claim 1, each of said bodies having a size falling within a range of between about ⅛ inch to 1 inch in overall length, and about ¼ inch to 1 inch in overall width.

6. The invention of claim 1, each of said bodies having a size falling within a range of between about ⅛ inch to ¾ inch in overall length and about ¼ inch to ¾ inch in overall width.

7. The invention of claim 1, including the step of repeatedly administering orally to the ruminent incremental quantities of said bodies at predetermined time intervals until a predetermined total quantity of said bodies have been administered to the ruminant.

8. The invention of claim 7, said predetermined total quantity of bodies administered to said ruminant being within a range of about ⅛ pound to approximately 1 pound for each 100 pounds of body weight.

9. The invention of claim 7, said bodies being orally or surgically administered to the ruminant at a daily rate of about ¼ to ⅛ of the total requirement.

10. The invention of claim 1, said bodies being formed of a synthetic resin material.

11. The invention of claim 10, said material being polyethylene.

12. The invention of claim 10, said material being polypropylene.

13. The invention of claim 10, said material being polystyrene.

14. A method of minimizing the adverse effects attendant upon feeding to ruminants a high energy, low roughage, ration, comprising:
   orally administering to the ruminant a quantity of relatively inert bodies,
   said bodies being characterized by the property of having sufficiently roughened surfaces defining outwardly extending portions and recesses to physiologically trigger secretion of saliva by the animal through physical contact with the wall of the animal's rumen,
   the specific gravity of said bodies being less than 1.

15. A method of minimizing the adverse effects attendant upon feeding to ruminants a high energy, low roughage ration comprising:
   admixing with the ration a quantity of relatively inert bodies of a size within a range of about ⅛ inch to 1 inch in overall length and about ¼ inch to 1 inch in overall width and having specific gravities less than 1, said bodies having roughened outer surfaces with raised portions and depressions sufficiently blunt to avoid damage to the stomach wall of the ruminant; and
   orally administering the mixture of said bodies and ration to the ruminant to physiologically stimulate secretion of sufficient saliva by physical contact of said roughened surfaces with the rumen wall to maintain a desirable pH within the rumen to enhance proper micro-organism action on said ration within the rumen.

16. A product for oral administration to ruminants for stimulating secretion of saliva flowing into the reticulo-rumen cavity comprising:
   a body formed from a relatively rigid, relatively inert material, said body including a plurality of outwardly extending projections,
   said projections terminating in relatively sharp outermost edges presenting a roughened outermost surface for said body and adapted to masage the wall of the stomach of said ruminant to trigger production of saliva flowing into said stomach, said material having a specific gravity less than the specific gravity of 1 to facilitate retention of said body by the ruminant.

17. The invention of claim 16, said material being a snythetic resin.

18. The invention of claim 17, said synthetic resin material being an extrudable plastic.

19. The invention of claim 17, said synthetic resin material being extruded to present said outwardly extending projections.

References Cited

UNITED STATES PATENTS

| | | | |
|---|---|---|---|
| 2,052,376 | 8/1936 | Zellers | 167—53 |
| 3,005,753 | 10/1961 | Virling | 167—53 |
| 3,119,738 | 1/1964 | Nichols | 167—53 |
| 3,130,054 | 4/1964 | Parker | 99—2 |
| 3,146,169 | 8/1964 | Stephenson et al. | 167—82 |
| 3,252,573 | 10/1964 | Kusaka | 119—1 |
| 3,166,476 | 1/1965 | Lowey | 167—82 |
| 3,256,857 | 6/1966 | Karras | 119—1 |
| 3,284,209 | 11/1966 | Kelley | 99—2 |

FOREIGN PATENTS 227,098  3/1960  Australia.

ALDRICH F. MEDBERY, *Primary Examiner.*

U.S. Cl. X.R.

99—2; 167—53